VAN ZANDT M. MOORE.
VEHICLE WHEEL.
APPLICATION FILED JUNE 4, 1912.

1,163,360.

Patented Dec. 7, 1915.

Witnesses-
Justin W. Macklin
J. A. McIntyre

Inventor-
Van Zandt M. Moore,
By Albert H. Baker,
Atty.

UNITED STATES PATENT OFFICE.

VAN ZANDT M. MOORE, OF CLEVELAND, OHIO, ASSIGNOR TO ANNA M. MOORE AND MARY S. MOORE, BOTH OF CLEVELAND HEIGHTS, OHIO, TRUSTEES OF THE ESTATE OF SAMUEL H. MOORE, DECEASED.

VEHICLE-WHEEL.

1,163,360.   Specification of Letters Patent.   Patented Dec. 7, 1915.

Application filed June 4, 1912.   Serial No. 701,526.

*To all whom it may concern:*

Be it known that I, VAN ZANDT M. MOORE, a citizen of the United States, residing at Cleveland, in the county of Cuyahoga and State of Ohio, have invented a certain new and useful Improvement in Vehicle-Wheels, of which the following is a full, clear, and exact description, reference being had to the accompanying drawings.

The object of this invention is to provide a vehicle wheel adapted to be made of a single casting which shall be strong, efficient, and at the same time light in weight.

To this end the invention consists of a vehicle wheel having a laterally extended hub, hollow spokes extending from the intermediate portion of the hub, and a hollow rim in communication with the spokes and extending laterally on opposite sides thereof and thereby adapted to carry a suitable elastic tire.

Another feature of the invention relates to the provision of webs between the spokes for carrying a brake flange without weakening the wheel.

The invention is hereinafter more fully explained in connection with the drawings, and the essential characteristics are summarized in the claim.

Figure 1:
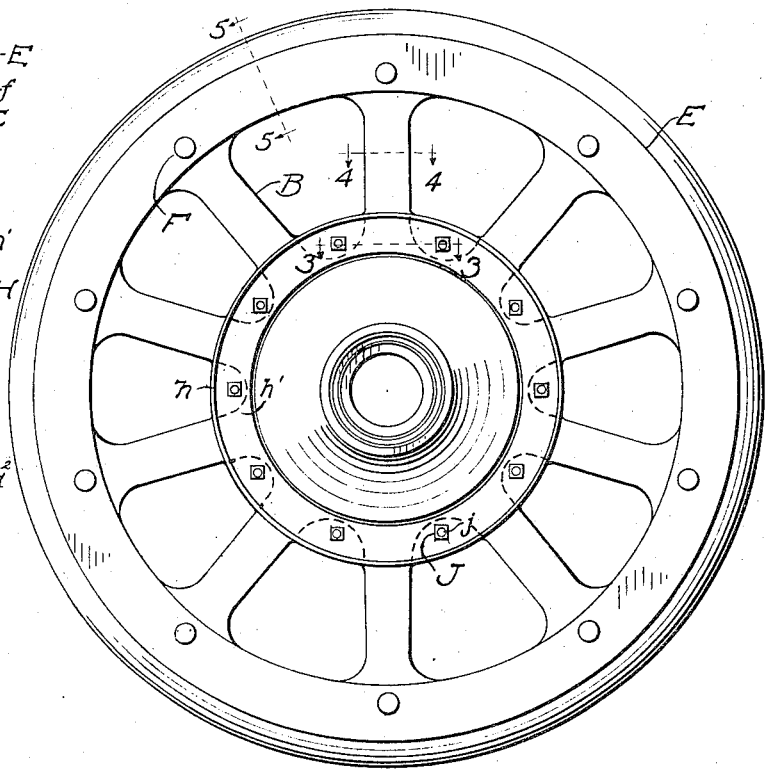
Figure 2:
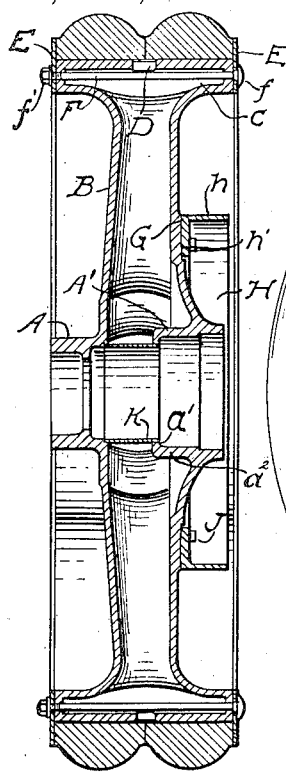
Figures 3, 4:
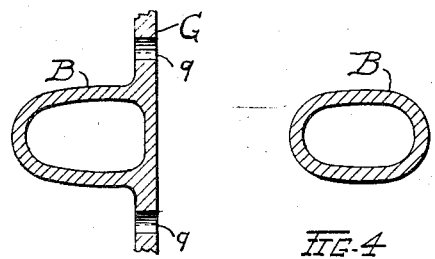
Figure 5:
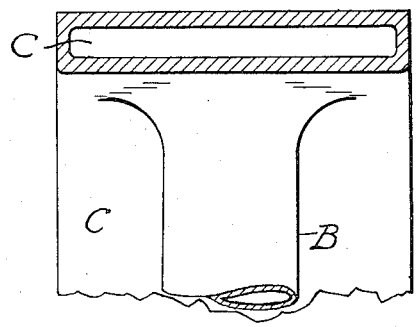

In the drawing, Figure 1 is a side elevation of my wheel: Fig. 2 is a radial cross section thereof along the center of one of the spokes; Figs. 3 and 4 are details, being cross sections through the spokes, as indicated by the lines 3—3 and 4—4 on Fig. 1; Fig. 5 is a radial cross section through the rim, as indicated by the line 5—5 on Fig. 1.

Referring to the parts by reference letters, A and A¹ represent the two opposite portions of the hub; B are the spokes extending from the hub, and C the hollow rim at the outer ends of the spokes and communicating with their interiors. The rim, spokes, and both portions of the hub are one integral casting. Preferably, to enable such wheel to be conveniently malleableized I arrange all of these parts so that they will have their metal of approximately the same thickness. In casting the wheel, the core may be conveniently supported beyond the opposite ends of the hub, and each arm of the core may be anchored through an opening D in the rim. The rim is hollow, as illustrated more particularly in Fig. 5, and it has an outer face designed with reference to the form of elastic tire it is to carry. The spokes are preferably elliptical in cross section, as illustrated in Fig. 4.

As shown in the drawings, the tire carried by my wheel is an elastic tire (duplex in the specific form shown) resting on the rim C and is shown as held in place by two side rings E and E¹ held on the rim by through-bolts F, provided with heads $f$ and nuts $f^1$. This enables convenient removal and replacement of the tire, when desired.

It is desirable to carry a brake flange on the wheel, and, in order that this may be accomplished without weakening the wheel by boring holes through its spokes, I provide webs G located between the spokes near the hub and substantially flush with the outermost portion of the spokes on their outer sides, as illustrated in Fig. 3. These webs, together with the flattened outer side of the intermediate spoke, provide a continuous, flat, annular face on which the brake flange H may be bolted. Such flange is shown in Fig. 2 as having a cylindrical member $h$ and an annular portion $h^1$ lying in a radial plane, which is bolted to the webs G referred to. Openings $g$ through the web G provide for these bolts, the bolts being designated J and shown as having nuts $j$.

To provide desirable bearing length to the hub portions A, A¹ without unduly widening the wheel, I prefer to extend one of such portions, as A¹, inwardly toward the central plane of the wheel, as shown at $a^2$ in Fig. 2. This projection of the hub inwardly beyond the connection with the spokes provides the desired bearing length for that side of the hub.

To close the hub from open communication with the spokes to prevent the escape of oil, etc., I prefer to drive a separate sleeve K into the interior of the hub, as shown in Fig. 2. This sleeve seats near one end in a recess or rabbet at the inner end of the hub portion A, and at the other end is embraced by an inwardly projecting flange $a^1$ of the hub portion $a^2$.

Having thus described my invention, what I claim is:

A vehicle wheel comprising a single casting composed of a pair of annular hub rings axially alined, a radial flange integral with each ring, one of said flanges being extended to form a seat for a brake ring, tubular spokes formed integral with and extending outward radially from said flanges, said extended portion of the flange merging with one face of the spokes, the flanges being connected together between the spokes and the adjacent spokes being connected by the same integral portions which arch outwardly when measured in planes in which the axis of the wheel lies and arch inwardly in planes at right angles to said axis, and a hollow annular rim formed integral with the outer ends of said spokes, the openings in said spokes communicating with the opening in the rim and with the chamber formed between the flanges by the connecting portions between the spokes.

In testimony whereof, I hereunto affix my signature in the presence of two witnesses.

VAN ZANDT M. MOORE.

Witnesses:
G. E. HARTSHORN,
ALBERT H. BATES.